United States Patent
Rogers et al.

(10) Patent No.: US 6,656,239 B1
(45) Date of Patent: Dec. 2, 2003

(54) BLENDED PITCH/COAL BASED CARBON FOAMS

(75) Inventors: Darren Kenneth Rogers, Wheeling, WV (US); Janusz Wladyslaw Plucinski, Glen Dale, WV (US)

(73) Assignee: Touchstone Research Lab., Triadelphia, WV (US)

( * ) Notice: Subject to any disclaimer, the term of this patent is extended or adjusted under 35 U.S.C. 154(b) by 0 days.

(21) Appl. No.: 10/068,075

(22) Filed: Feb. 5, 2002

(51) Int. Cl.[7] .................................................. C10L 5/00
(52) U.S. Cl. .............................. 44/620; 44/607; 44/628; 423/448; 423/460; 264/29.1; 428/408
(58) Field of Search ........................ 44/620, 607, 628; 423/448, 460; 201/35; 264/29.1; 428/408

(56) References Cited

U.S. PATENT DOCUMENTS

| | | |
|---|---|---|
| 3,018,227 A | 7/1962 | Baum et al. |
| 3,111,396 A | 11/1963 | Ball |
| 3,185,635 A | 5/1965 | Creglow |
| 3,309,437 A | 3/1967 | Harnett |
| 3,754,876 A | 8/1973 | Pennington et al. |
| 4,127,391 A | 11/1978 | Koppelman |
| 4,128,401 A | 12/1978 | Powell et al. |
| 4,432,773 A | 2/1984 | Euker, Jr. et al. |
| 4,475,924 A | 10/1984 | Meyer |
| 4,632,731 A | 12/1986 | Bodle et al. |
| 4,668,244 A | 5/1987 | Nakamura et al. |
| 4,849,021 A | 7/1989 | Nakai et al. |
| 5,705,139 A | 1/1998 | Stiller et al. |
| 5,888,469 A | 3/1999 | Stiller et al. |
| 6,033,506 A * | 3/2000 | Klett ........................... 156/78 |

FOREIGN PATENT DOCUMENTS

GB    1 489 690    10/1977

* cited by examiner

*Primary Examiner*—Margaret Medley
(74) *Attorney, Agent, or Firm*—McGuire Woods LLP

(57) ABSTRACT

According to the present invention, carbon foams are produced largely in accordance with the methods described in U.S. patent application Ser. No. 09/902,828, but with starting materials that comprise from about 10 to about 90% by weight of ground petroleum pitch and from about 90 to about 10% by weight of bituminous coal particulate exhibiting a free swell index of from about 3.5 to about 5.0.

33 Claims, No Drawings

BLENDED PITCH/COAL BASED CARBON FOAMS

FIELD OF THE INVENTION

The present invention relates to low density, high strength carbon foams prepared by the controlled foaming of petroleum pitch and coal particulate blends.

BACKGROUND OF THE INVENTION

ASTM standards DD5515-97, "Standard Test Method for the Determination of Swelling Properties of Bituminous Coal" and D720-91 "Standard Test Method for Free Swelling Index of Coal" both define conditions for measuring the inherent property of coals to "swell" upon heating in an uncontrolled combustion situation. Hence, the propensity of coal to swell is well known in the prior art. To the best of our knowledge, however, no one has attempted to take advantage of this property of coals to swell by controllably "swelling" a coal product to obtain a highly useful, low density, porous carbon product.

U.S. patent application Ser. No. 09/902,828 filed Jul. 7, 2001 describes coal-based cellular or porous products having a density of preferably between about 0.1 g/cm³ and about 0.8 g/cm³ that are produced by the controlled heating of coal particulate preferably up to ¼ inch in diameter in a "mold" and under a non-oxidizing atmosphere. According to a specifically preferred embodiment, the starting material coal has a free swell index as determined by aforementioned ASTM D720 test of between about 3.5 and about 5.0. The porous product thereby produced, preferably as a net shape or near net shape, can be machined, adhered and otherwise fabricated to produce a wide variety of low cost, low density products, or used in its preformed shape as a filter, heat or electrical insulator etc. Such cellular products, without further treatment and/or the addition of strengthening additives have been shown to exhibit compressive strengths of up to about 4000 psi. Impregnation with appropriate materials or the incorporation of various strength improving additives can further increase the compressive, tensile and other properties of these cellular materials. Further treatment by carbonization or graphitization yields cellular products that can be used as electrical or heat conductors.

A variety of carbon foams have been produced by the foaming of petroleum pitch largely through the use of blowing or foaming agents. While these materials, carbon foams exhibit higher thermal conductivities than coal-based carbon foams produced as described in the aforementioned U.S. Patent Application, they are considerably weaker and hence not well adapted to application in areas where such physical properties as compressive, tensile and shear strength as well as impact resistance are of significant importance.

Thus, while the methods and products described in the foregoing U.S. Patent Application and those produced by certain competitive methods from petroleum pitch are entirely satisfactory for certain defined purposes that either demand high strength in exchange for high thermal conductivity or vice vesa, it has been deemed desirable to provide foams of yet lower density, i.e. on the order of or below about 0.4 g/cm³, of a wider variation in cell size and of increased thermal conductivity that exhibit strengths approaching those of the coal-based carbon foams previously described. Additionally, the ability to better tailor the foregoing properties to meet specific requirements is also highly desirable.

OBJECTS OF THE INVENTION

It is therefore an object of the present invention to provide carbon foams produced from starting materials that permit better control of and variation in such properties as foam density, larger cell size range and enhanced thermal conductivity to meet specific end use requirements.

It is another object of the present invention to provide such materials and methods that utilize starting materials at least partially different than those described in the foregoing U.S. patent application Ser. No. 09/902,828.

SUMMARY OF THE INVENTION

According to the present invention, carbon foams are produced largely in accordance with the methods described in foregoing U.S. patent application Ser. No. 09/902,828, but with starting materials that comprise from about 10 to about 90% by weight of ground petroleum pitch and from about 90 to about 10% by weight of bituminous coal particulate exhibiting a free swell index of from about 3.5 to about 5.0. The relatively lower melting point of the petroleum coke permits this material to flow about the coal particulate thereby encapsulating the coal particulate prior to the onset of the foaming of the coal particulate thereby permitting the production of carbon foams that exhibit larger bubble or cell sizes and consequently are of lower density than those conventionally produced in accordance with solely coal particulate starting materials. The presence of the petroleum pitch permits the fabrication of carbon foams exhibiting enhanced thermal conductivity. The blending of varying relative amounts of petroleum pitch and coal particulate in the carbon foam production process permits the formulation of custom carbon foams that exhibit the appropriate balances between strength, as provided by the coal particulate, and thermal conductivity, as provided by the petroleum pitch in the starting material.

DETAILED DESCRIPTION

According to the present invention, a preformed, low density, i.e., from about 0.1 to about 0.5 g/cm³, and preferably from about 0.1 to about 0.4 g/cm³, cellular product is produced from a blend of a powdered coal particulate preferably less than about ¼ inch in diameter blended with from about 10 to about 90 weight percent of ground petroleum pitch (also preferably of a particle size of less than about ¼ inch in diameter) by the controlled heating of the powdered coal/petroleum pitch blend in a "mold" under a non-oxidizing atmosphere.

The starting material coal may include bitumen, anthracite, or even lignite, or blends of these coals that exhibit a "free swell index" as determined by ASTM D720 of between about 3.5 and about 5.0, and preferably between about 3.75 and 4.5, but are preferably bituminous, agglomerating coals that have been comminuted to an appropriate particle size, preferably to a fine powder below about −60 to −80 mesh. The most preferred coal starting materials are so-called "high volatile" bituminous coals as described below. According to further preferred embodiments of the present invention, the starting material coal exhibits one or more and preferably all of the following set of properties: 1) a volatile matter content (dry, ash-free basis) of between about 35 and about 35% as defined by ASTM D3175, "Test Method for Volatile Matter in the Analysis of Coal and Coke", so-called "high volatile" coals; 2) a fixed carbon (dry basis) defined by ASTM D3172, "Practice for Proximate Analysis of Coal and Coke"; 3) a Gieseler initial softening temperature of between about 380° C. and about 400° C. as determined by ASTM D2639, Test Method for Plastic Properties of Coal by the Constant-Torque Gieseler Plastometer"; 4) a plastic temperature range above about 50° C. as determined by ASTM D2639; 5) a maximum fluidity of at least 300 ddpm (dial divisions per minute) and preferably greater than about 2000 ddpm as determined by ASTM D2639; 6) expansion greater than about 20% and preferably greater than about 100% as determined by Arnu Dilatation; 7) vitrinite reflectance in the range of from about 0.80 to about 0.95 as determined by ASTM D2798, "Test Method for Microscopical Determination of the Reflectance of Vitrinite in Polished Specimens of Coal"; 8) less than about 30% inert maceral material such as semifusinite, micrinit, fusinite, and mineral matter as determined by ASTM D2798; and 9) no significant oxidation of the coal (0.0 vol % moderate or severe oxidation) as determined by ASTM D 2798 and non-maceral analysis.

The low softening point (380–400° C.) is important so that the material softens and is plastic before volatalization and coking occur. The large plastic working range or "plastic range" is important in that it allows the coal to flow plastically while losing mass due to volatalization and coking. Vitrinite reflectance, fixed carbon content and volatile matter content are important in classifying these coal starting materials as "high-volatile" bituminous coals that provide optimum results in the process of the present invention and thus, carbon foam materials that exhibit an optimum combination of properties when prepared in accordance with the process described and claimed herein. The presence of oxidation tends to hinder fluidity and consequently, foam formation.

Thus according to various preferred embodiments of the present invention, a coal particulate starting material characterized as a high-volatile bituminous coal containing from about 35% to about 45% by weight (dry, ash-free basis) volatile matter, as defined by ASTM D3175, is a basic requirement for obtaining optimum results in the form of optimum carbon foaming in accordance with the process of the present invention. The various parameters derived from the Gieseler plasticity evaluations form the second highly important set of characteristics of the starting material coal if optimum results are to be obtained. Thus, a softening point in the range of from about 380° C. and about 400° C., a plastic range of at least about 50° C. and preferably between about 75 and 100° C., and a maximum fluidity of at least several hundred and preferably greater than 2000 ddpm(dial divisions per minute) are highly important to the successful optimized practice of the present invention. Accordingly, in order to obtain the carbon foams exhibiting the superior properties described herein, it is important that the coal starting material be a high volatile bituminous coal having a softening point as just described and a plastic range on the order of above about 50° C. all with the indicated Gieseler fluidity values described. Exhibition of Arnu dilatation values greater than about 20% and preferably above about 100% when combined with the foregoing characteristics provide indications of a highly preferred high volatile bituminous coal starting material.

Selection of starting materials within the foregoing parameters was determined by evaluating a large number of coals characterized as ranging from high to low volatiles. In general, it has been found that so-called "high volatile" bituminous coals, i.e. those comprising from about 35 to about 45 weight percent volatile material and thus exhibiting free swell indexes within the previously specified ranges provided the best foam products in the form of the lowest calcined foam densities and the highest calcined foam specific strengths (compressive strength/density). Coals having free swell indices below these preferred ranges may not agglomerate properly leaving a powder mass or sinter even in the presence of the petroleum pitch, but not swell or foam, while coals exhibiting free swell indices above these preferred ranges may heave upon foaming and collapsed upon themselves leaving a dense compact.

The petroleum pitch may be any suitable petroleum pitch that exhibits a melting point below that of the previously described particulate coal, i.e. generally between about 50 and about 300° C., and which will undergo foaming when subjected to the treatment conditions described hereinafter for the foaming of the coal/petroleum pitch blend. According to the processing method described hereinafter, the petroleum pitch is similarly ground to a relatively fine particulate below about ¼ inch and blended with the coal particulate prior to the onset of processing to form the carbon foams of the present invention.

The carbon foams described herein are semi-crystalline or more accurately turbostratically-ordered and largely isotropic i.e., demonstrating physical properties that are approximately equal in all directions. The cellular coal-based products of the present invention typically exhibit pore sizes on the order of 300 $\mu$ or greater, although pore sizes of up to 500 $\mu$ and greater are possible within the operating parameters of the process described. The thermal conductivities of the cellular coal-based products are generally greater than about 1.0 W/m/° K. Typically, the carbon foams of the present invention demonstrate compressive strengths on the order of from about 2000 to about 6000 psi at densities of from about 0.4 to about 0.5 g/cm$^3$ It is critical to the successful practice of the present invention that the coal starting material exhibit the previously specified free swell index of between about 3.5 and about 5.0 and preferably between about 3.75 and about 4.5. Impregnation with appropriate materials or the incorporation of various strength improving additives can further increase the compressive, tensile and other properties of these cellular materials. Further treatment by carbonization or graphitization yields cellular products that can be used as electrical or heat conductors.

The production method of the present invention comprises: 1) blending coal particulate and petroleum pitch particulate to form a coal particulate/petroleum pitch particulate blend comprising from about 10 to about 90 weight percent petroleum pitch and the balance coal particulate each particulate being of preferably small size, i.e., less than about ¼ inch particles; 2) heating the coal particulate/petroleum pitch particulate blend to a temperature adequate to permit the petroleum pitch particulate to soften and "encapsulate" the coal particulate to form a "green blend", generally this temperature is between about 50 and 300° C. and the time required for "encapsulation" is on the order of several minutes once softening occurs; 3) heating the "green blend" in a "mold" and under a non-oxidizing atmosphere at a heat up rate of from about 1 to about 20° C. to a temperature of between about 300 and about 700° C.; 4) soaking at a temperature of between about 300 and 700° C. for from about 10 minutes up to about 12 hours to form a "green foam"; and 5) controllably cooling the "green foam" to a temperature below about 100° C. The non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

Blending of the coal and petroleum pitch particulates can be obtained using any conventional blending apparatus of the type generally applied in the art to obtain uniform blends of particulate materials.

"Encapsulation" or the treatment of the coal/petroleum pitch particulate blend to achieve surrounding of the coal particulate with a "film" of softened petroleum pitch that softens at a temperature below that required for the onset of expansion is performed at a temperature within the softening range of the petroleum pitch. This is generally at a temperature of between about 50 and about 300° C. depending upon the particular petroleum pitch utilized. Since at these temperatures, no expansion or foaming will have initiated, the heat up rate is not particularly critical. The period of soaking or retention of the particulate blend at or somewhat above the softening temperature of the petroleum pitch is similarly not of critical importance, so long as the "film" of softened petroleum pitch encapsulates the coal particulate. This will generally occur in a matter of minutes to a few hours and may be accelerated by providing a means of "tumbling" or otherwise increasing the contact that occurs between the coal particulate and the softened petroleum pitch.

As will be apparent to the skilled artisan, "encapsulation" of the coal particulate by the softened petroleum pitch in the "green blend", as described above, can be achieved outside of the mold and the "green blend" subsequently placed into the mold, or the "encapsulation" operation may be carried out in the mold where subsequent heating and carbon foam formation will be attained.

The term "mold", as used herein is meant to define a mechanism for providing controlled dimensional forming of the expanding coal. Thus, any chamber into which the coal/petroleum pitch particulate blend is deposited prior to or during heating and which, upon the "green blend" attaining the appropriate "encapsulation" and expansion temperatures, contains and shapes the expanding porous coal to some predetermined configuration such as: a flat sheet; a curved sheet; a shaped object; a building block; a rod; tube or any other desired solid shape can be considered a "mold" for purposes of the instant invention.

It is generally not desirable that the reaction chamber or mold be vented or leak during the heating and soaking operations. The pressure of the chamber and the increasing volatile content therein tends to retard further volatilization while the carbon foam sinters at the indicated elevated temperatures. If the furnace is vented or leaks during soaking, an insufficient amount of volatile matter may be present to permit inter-particle sintering of the coal particles thus resulting in the formation of a sintered powder as opposed to the desired cellular product. Thus, according to a preferred embodiment of the present process, venting or leakage of non-oxidizing gas and generated volatiles is inhibited consistent with the production of an acceptable cellular product or foam.

Additional more conventional blowing agents may be added to the particulate blend prior to expansion to enhance or otherwise modify the pore-forming operation.

As will be apparent to the skilled artisan familiar with pressurized gas release reactions, as the pressure in the reaction vessel, in this case the mold increases, from 0 psi to 500 psi, as imposed by the non-oxidizing gas, the reaction time will increase and the density of the produced porous coal will increase as the size of the "bubbles" or pores produced in the expanded coal decreases. Similarly, a low soak temperature at, for example about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the carbon foams of the present invention in a wide variety of controlled densities, strengths etc.

Cooling of the green foam after soaking is not particularly critical except as it may result in cracking of the green foam as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is in no way critical.

After expanding the high volatile bituminous coal/petroleum pitch particulate blend to form the green foam as just described, the porous or foamed product is an open celled material. Several techniques have been developed for "sealing" the surface of the open celled structure to improve its adhesive capabilities for further fabrication and assembly of a number of parts. For example, a layer of a commercially available graphitic adhesive can be coated onto the surface and cured at elevated temperature or allowed to cure at room temperature to provide an adherent skin. Alternatively, the expansion operation can be modified by cooling the expanded coal product or preform rapidly, e.g., at a rate of 10° C./min or faster after expansion. It has been discovered that this process modification results in the formation of a more dense skin on the preform or product which presents a closed pore surface to the outside of the preform or product. At these cooling rates, care must be exercised to avoid cracking of the preform or product.

After expanding, the green foam produced in accordance with the present invention, is readily machineable, sawable and otherwise readily fabricated using conventional fabrication techniques.

Subsequent to production of the green foam as just described, it may be subjected to carbonization and/or graphitization according to conventional processes to obtain particular properties desirable for specific applications of the type described hereinafter. Ozonation may also be performed, if activation of the green foam would be useful in a final product application such as in filtering of air. Additionally, a variety of additives and structural reinforcers may be added to the coal/petroleum pitch blend either before or after expansion to enhance specific mechanical properties such as fracture strain, fracture toughness and impact resistance. For example, particles, whiskers, fibers, plates, etc. of appropriate carbonaceous or ceramic composition can be incorporated into the green foam to enhance its mechanical properties.

The carbon foams, of the present invention can additionally be impregnated with, for example, additional petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties.

The cooling step in the expansion process results in some relatively minimal shrinkage on the order of less than about 5% and generally in the range of from about 2% to about 3%. This shrinkage must be accounted for in the production of near net shape carbon foams of specific dimensions and is readily determinable through trial and error with the particular coal/petroleum pitch starting materials being used. The shrinkage may be further minimized by the addition of some inert solid material such as coke particles, ceramic particles, ground waste from the coal expansion process etc. as is common practice in ceramic fabrication.

Carbonization, sometimes referred to as calcining, is conventionally performed by heating the green foam under an appropriate inert gas at a heat-up rate of less than about 5° C. per minute to a temperature of between about 800° C. and about 1200° C. and soaking for from about 1 hour to about three or more hours. Appropriate inert gases are those described above that are tolerant of these high temperatures. The inert atmosphere is supplied at a pressure of from about 0 psi up to a few atmospheres. The carbonization/calcination process serves to remove all of the non-carbon elements present in the green foam such as sulfur, oxygen, hydrogen, etc.

Graphitization, commonly involves heating the green foam either before or after carbonization at heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

The carbon foams resulting from processing in accordance with the foregoing procedures can be used in a broad variety of product applications, some, but not all, of which will now be broadly described.

Perhaps the simplest products that could be fabricated using the carbon foams of the present invention are various lightweight sheet products useful in the construction industry. Such products may involve the lamination of various facing materials to the surface of a planar sheet of the preform material using an appropriate adhesive. For example, a very light and relatively inexpensive wall board would simply have paper laminated to its opposing planar surfaces, while a more sophisticated curtain wall product might have aluminum sheet, polymer or fiber-reinforced polymer sheets or even stainless steel sheet laminated thereto. A wide variety of such products that have lightweight, low cost and adequate strength can easily be envisioned for wallboard, structural wallboard, bulkheads, etc. The materials of the present invention exhibit sound insulation and vibration resistance due to excellent sound and vibration damping properties. Controlled thermal conductivity may also be designed into the carbon foam due to the presence of the petroleum pitch in the initial particulate blend.

Laminates of these materials may even be used to produce heating element incorporating members, since a graphitized core could serve as an electrical heating element when connected to an appropriate source of electrical energy.

Similar surface laminated carbon foam core based products could also find use in the transportation industry where lighter and, especially fire retardant walls, bulkheads, containers, etc. are in constant demand. Such products would of course require that the carbon foam be carbonized as described hereinabove prior to application of the exterior skins, if fire resistance or retardancy is desired.

Yet another product application for the carbon foams of the present invention is as a replacement for the ceramic foam filters currently applied in the filtering of molten metal such as aluminum for the removal of contaminating particulates also called inclusions. The current ceramic foam materials are relatively expensive and extremely friable. It is easily possible to produce a carbon foam of the type described herein having an appropriate pore size and of the same size and shape as the ceramic foam filter using the above described fabrication process, to serve as a molten metal filter of this type. The cost of such a more robust, i.e., less friable, filter would be considerably less than that of a comparable ceramic foam filter.

Yet other product applications for the carbon foam materials of the present invention reside in the field of heat exchangers. In this application, the heat transfer properties of a graphitized carbon foam can be exploited to produce a heat exchanger capable of extracting heat from or adding heat to a fluid (gas or liquid) flowing through porous foam. In this case, the carbon foam is joined to an appropriate heat transfer mechanism such as an aluminum skin.

As already alluded to, the carbon foams of the present invention can be produced in any solid geometric shape. Such production is possible using any number of modified conventional processing techniques such as extrusion, injection molding, etc. In each of such instances, the process must, of course, be modified to accommodate the processing characteristics of the starting material coal. For example, in extruding such products, as described below, the coal powder starting material is fed by an auger into an expansion chamber where it is expanded and from which it is extruded while still viscous, i.e. within the "plastic range" of the particulate blend. Upon exiting the extrusion die, the material is cooled to provide a solid shape of the desired and precalculated dimensions. Of course the "encapsulation" can be achieved by heating the green blend to a temperature below the expansion point, e.g., below about 300° C., feeding the "encapsulated blend" into the auger chamber where additional heat is imparted to the particulate blend to initiate expansion with final heating and expansion being achieved just before extrusion through the die.

Similar relatively minor process modifications can be envisioned to fabricate the carbon foams of the present invention in injection molding, casting and other similar conventional material fabrication processes.

As the invention has been described, it will be apparent to those skilled in the art that the same may be varied in many ways without departing from the spirit and scope of the invention. Any and all such modifications are intended to be included within the scope of the appended claims.

What is claimed is:

1. A semi-crystalline, largely isotropic, carbon foam produced from a blend comprising: 1) from about 10 to about 90 weight percent of a particulate high volatile bituminous coal that exhibits a free swell index of between about 3.5 and about 5.0; and 2) from about 90 to about 10 weight percent of a petroleum pitch particulate, said carbon foam having a density of between about 0.1 and about 0.6 g/cm$^3$.

2. The carbon foam of claim 1 wherein said coal exhibits a free swell index of between about 3.75 and about 4.5.

3. The carbon foam of claim 2 having a compressive strength below about 6000 psi.

4. The carbon foam of claim 2 that has been carbonized.

5. The carbon foam of claim 2 that has been graphitized.

6. The semi-crystalline, largely isotropic, carbon foam of claim 1 wherein said high volatile bituminous coal contains between about 35% and 45% by weight of volatile matter.

7. The semi-crystalline, largely isotropic, carbon foam of claim 6 wherein said high volatile bituminous coal has a Gieseler initial softening temperature above about 380° C.

8. The semi-crystalline, largely isotropic, carbon foam of claim 7 wherein said high volatile bituminous coal has a Gieseler initial softening temperature between about 380° C. and about 400° C.

9. The semi-crystalline, largely isotropic, carbon foam of claim 6 wherein said high volatile bituminous coal has a plastic range of at least about 50° C.

10. The semi-crystalline, largely isotropic, carbon foam of claim 9 wherein said high volatile bituminous coal has a plastic range of from about 75° C. to about 100° C.

11. The semi-crystalline, largely isotropic, carbon foam of claim 9 wherein said high volatile bituminous coal has a maximum fluidity of at least several hundred ddpm as determined by ASTM D2639.

12. The semi-crystalline, largely isotropic, carbon foam of claim 9 wherein said high volatile bituminous coal has a maximum fluidity of more than 2000 ddpm as determined by ASTM D2639.

13. The semi-crystalline, largely isotropic, carbon foam of claim 9 wherein said high volatile bituminous coal exhibits an expansion of at least about 20% as determined by Arnu dilatation.

14. The semi-crystalline, largely isotropic, carbon foam of claim 13 wherein said high volatile bituminous coal exhibits an expansion of at least about 100% as determined by Arnu dilatation.

15. The semi-crystalline, largely isotropic, carbon foam of claim 13 wherein said high volatile bituminous coal: 1) comprises; A) from about 50 to about 60% by weight of fixed carbon; and B) less than about 30% by weight inert maceral material; 2) exhibits a vitrinite reflectance in the range of from about 0.80 and about 0.95 as determined by ASTM D2798 and 3) exhibits 0.0 volume % moderate or severe oxidation as determined by ASTM D2798.

16. The semi-crystalline, largely isotropic, carbon foam of claim 1 having a density of between about 0.2 g/cm$^3$ and about 0.6 g/cm$^3$.

17. The carbon foam of claim 6 that has been carbonized.

18. A method for producing a carbon foam from a blend comprising:
   1) from about 10 to about 90 weight percent of a high volatile bituminous coal particulate that exhibits a free swell index of between about 3.5 and about 5.0; and 2) from about 90 to about 10 weight percent of a petroleum pitch having a softening temperature between about 50 and about 300° C., comprising:
      A) blending fine particulate of said high volatile bituminous coal and fine particulate of said petroleum pitch to form a green blend;
      B) heating said green blend at a temperature and for a period of time adequate to achieve encapsulation of said particulate coal in said petroleum pitch to form an encapsulated coal particulate;
      C) heating said encapsulated coal particulate in a mold under a non-oxidizing atmosphere to a temperature of between about 300° C. and about 700° C. and soaking at this temperature for a period of from about 10 minutes to about 12 hours to form said carbon foam; and
      D) controllably cooling said carbon foam.

19. The method of claim 18 wherein said high volatile bituminous coal exhibits a free swell index of between about 3.75 and about 4.5.

20. The method of claim 18 wherein said inert atmosphere is applied at a pressure of from about 0 psi up to about 500 psi.

21. The method of claim 18 wherein said temperature is achieved using a heat-up rate of between about 1° C. to about 20° C. per minute.

22. The method of claim 18 wherein said controlled cooling is accomplished at a rate of less than about 10° C./min to a temperature of about 100° C.

23. The method of claim 18 wherein said high volatile bituminous coal contains between about 35% and 45% by weight of volatile matter.

24. The method of claim 23 wherein said high volatile bituminous coal has a Gieseler initial softening temperature above about 380° C.

25. The method of claim 24 wherein said high volatile bituminous coal has a Gieseler initial softening temperature between about 380° C. and about 400° C.

26. The method of claim 18 wherein said high volatile bituminous coal has a plastic range of at least about 50° C.

27. The method of claim 26 wherein said high volatile bituminous coal has a plastic range of from about 75° C. to about 100° C.

28. The method of claim 26 wherein said high volatile bituminous coal has a maximum fluidity of at least several hundred ddpm as determined by ASTM D2639.

29. The method of claim 26 wherein said high volatile bituminous coal has a maximum fluidity of more than 2000 ddpm as determined by ASTM D2639.

30. The method of claim 26 wherein said high volatile bituminous coal exhibits an expansion of at least about 20% as determined by Arnu dilatation.

31. The method of claim 30 wherein said high volatile bituminous coal exhibits an expansion of at least about 100% as determined by Arnu dilatation.

32. The method of claim 30 wherein said high volatile bituminous coal: 1) comprises: A) from about 50 to about 60% by weight of fixed carbon; and B) less than about 30% by weight inert maceral material; 2) exhibits a vitrinite reflectance in the range of from about 0.80 and about 0.95 as determined by ASTM D2798 and 3) exhibits 0.0 volume % moderate or severe oxidation as determined by ASTM D2798.

33. The method of claim 18 wherein said carbon foam has a density of between about 0.2 g/cm$^3$ and about 0.6 g/cm$^3$.

* * * * *

UNITED STATES PATENT AND TRADEMARK OFFICE
CERTIFICATE OF CORRECTION

PATENT NO. : 6,656,239 B1 Page 1 of 1
DATED : December 2, 2003
INVENTOR(S) : Darren Kenneth Rogers et al.

It is certified that error appears in the above-identified patent and that said Letters Patent is hereby corrected as shown below:

Column 1,
Line 3, -- This invention was made with Government support under Contract Number F33615-00-C-5007 awarded by the Air Force Research Laboratory. The Government has certain rights in the invention. --.

Signed and Sealed this

Sixth Day of July, 2004

JON W. DUDAS
*Acting Director of the United States Patent and Trademark Office*